July 21, 1964  G. E. DAVIES ETAL  3,141,231
METHOD OF FABRICATING A BALL AND SOCKET ASSEMBLY
Filed April 17, 1961  2 Sheets-Sheet 1
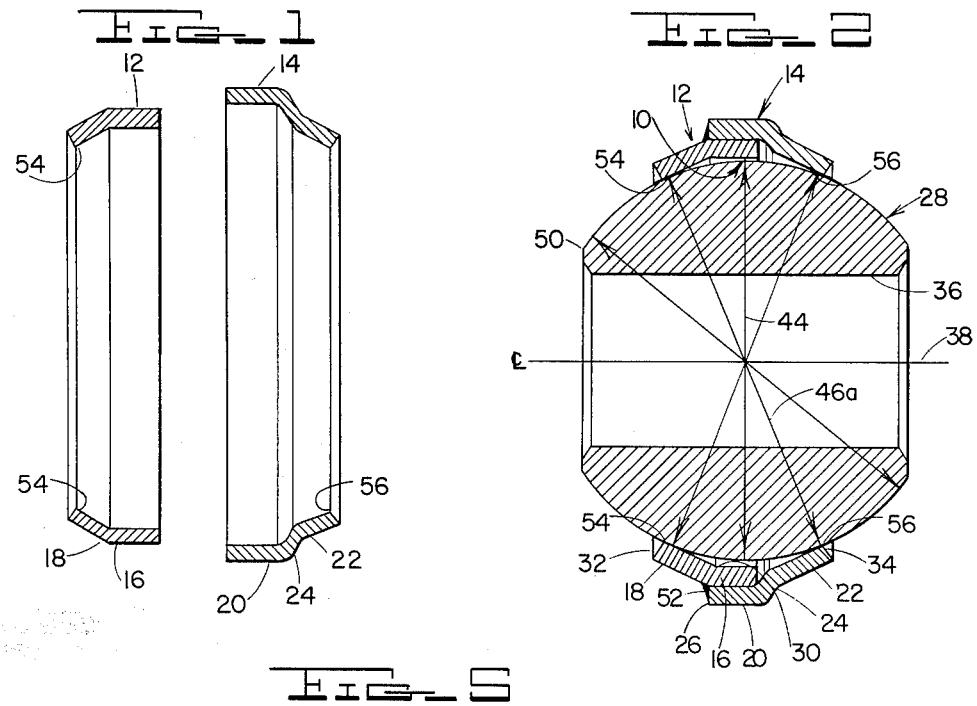
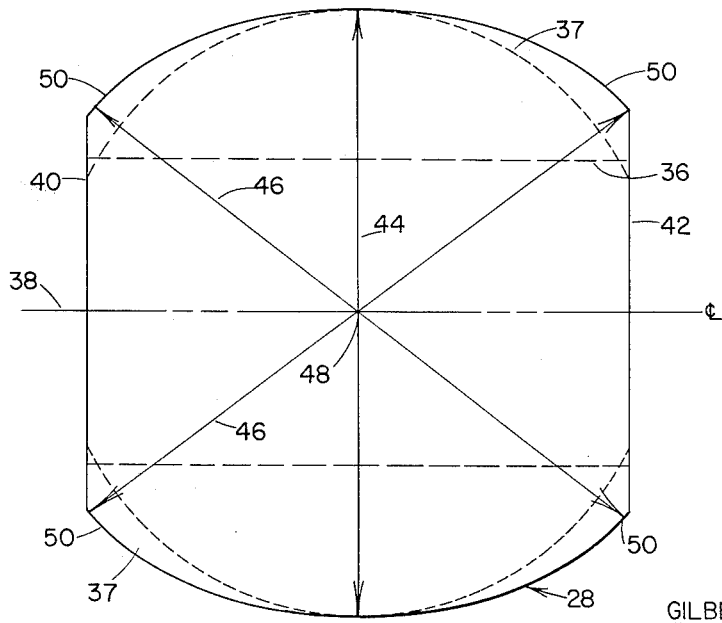
INVENTORS
GILBERT E. DAVIES
EVERETT V. WEISSBRODT
BY Gush + Irish
ATTORNEYS

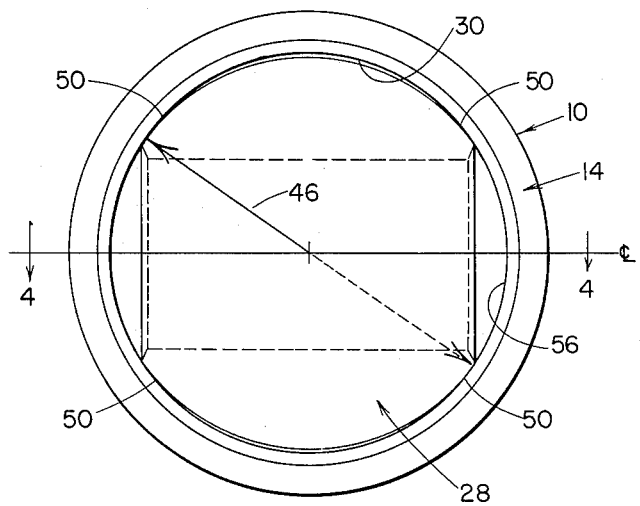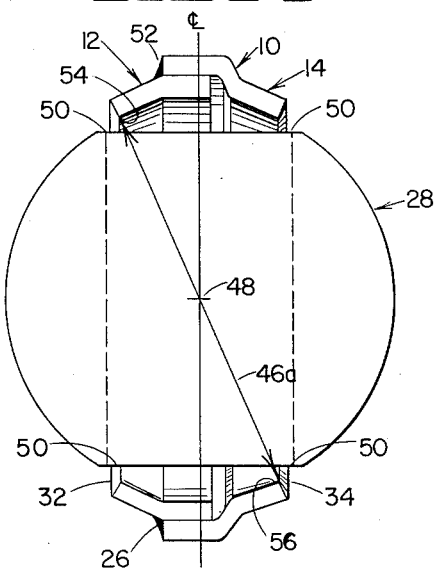

United States Patent Office
3,141,231
Patented July 21, 1964

3,141,231
METHOD OF FABRICATING A BALL AND
SOCKET ASSEMBLY
Gilbert E. Davies and Everett V. Weissbrodt, Fort Wayne, Ind., assignors to Superior Ball Joint Corporation, New Haven, Ind.
Filed Apr. 17, 1961, Ser. No. 103,541
7 Claims. (Cl. 29—149.5)

The present invention relates to a ball and socket assembly and to the method of fabricating the same.

Of the various and sundry designs of ball and socket assemblies, one of these uses a socket of annular configuration wherein the ball may project from opposite sides thereof. Such sockets are commonly fabricated of integral segments of raw stock which may either be forged or coined into the socket shape. Such integral segments usually take the form of tubular steel sleeves cut to short lengths. In fabrication of the socket, the ball, which is prehardened, is inserted into the tubular sleeve and thereafter the assembly is placed into a forging or coining machine which deforms the opposite ends of the sleeve inwardly onto and against the ball as a backing in order to form the shape of the retaining socket. In this instance, it is necessary for the ball to be prehardened, since in the forging or coining operation it serves as the matrix tool against which the forming operation is performed.

This method of fabricating the ball and socket assembly is inherently time-consuming and expensive. Furthermore, considerable difficulty is involved in attaining proper operating clearances between the ball and the socket. If the clearances are not adequate, there will be an undue amount of friction which resists swiveling movement of the ball in the socket. If this friction is extreme, it will positively prevent the ball from swiveling in the first instance, thereby defeating the entire purpose of the ball and socket joint.

Additionally, since the tubular sleeve is deformed around and onto the ball, it is impossible to determine the shape and extent of the bearing surfaces internally of the socket. The finished assembly, therefore, cannot be properly inspected to guard against defective assemblies getting into the field. In other words, if the internal surfaces of the socket are defective in some respect, such as not being properly formed or having cracks or the like, this defect cannot be detected until the assembly has failed. This, of course, is to be avoided if at all possible.

In accordance with the present invention, it is an object to provide a method whereby a ball and socket assembly of the type contemplated hereinabove may be fabricated expeditiously, efficiently and economically.

It is another object of this invention to provide a method of assembling ball and socket joints whereby clearances between the ball and socket are positively controlled and automatically provided.

It is still another object of this invention to provide a method wherein the bearing surfaces of the socket are preformed to precise shapes which are predetermined prior to the ball being assembled to the socket.

It is yet another object of this invention to provide a ball and socket assembly which may be expeditiously, efficiently and economically manufactured.

It is still another object of this invention to provide a ball and socket assembly wherein the proper operating clearances are assured as are the shapes of the bearing surfaces inside the socket.

It is a further object of the invention to provide a ball and socket assembly wherein the ball is out-of-round to cooperate uniquely with the socket to assure full swiveling angle without any binding or undue friction.

Other objects will become apparent as the description proceeds.

In accomplishing the objects of this invention there is provided a ball and socket assembly comprising a ball member mounted for swiveling movement in an annular shaped socket, this socket comprising first and second annular sections secured together, the first of these sections having a cylindrical portion on one end and an inturned portion on the other end which is of frusto-conical shape, the second of these sections having a cylindrical portion on one end and an inturned portion on the other end which is also frusto-conical in shape, the cylindrical portions of the two sections being telescoped and welded together in such position that the respective inturned portions are spaced apart to define the aforesaid socket, the ball member being retained by the socket for swiveling movement, said ball member being ellipsoidal in shape and having a major axis, the frusto-conical portions of the two sections at their outer ends respectively having opposed bearing surfaces spaced apart along a straight line which intersects the major axis midway between the ends thereof, the distance between said bearing surfaces along said line being substantially equal an angular diameter of said ball member which extends between the farthest separated of the opposed surfaces of said ball member, said angular diameter intersecting the major axis at the same point at which the latter is intersected by said line, the opposed portions of asid socket between said bearing surfaces being spaced apart distances which are greater than any diametral dimension of said ball member for providing a clearance with said ball member.

Further in the accomplishment of the foregoing objects, one method of fabricating the ball and socket assembly comprises the steps of forming a ball member to an ellipsoidal shape, fabricating a first annular section which has a cylindrical portion on one end and an inturned frustoconically shaped portion on the other end, fabricating a second annular section which has a cylindrical portion on one end and an inturned frusto-conically shaped portion on the other end, assembling both said annular sections onto said ball member with said cylindrical portions being telescoped together, positioning said ball member in said sections such that said inturned portions engage the largest diameter portions of said ball member, and welding said cylindrical portions together during the aforesaid engagement, thereby providing an integrated socket assembly which retains said ball member.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a cross-sectional illustration of two annular sections which comprise the socket of one embodiment of the present invention;

FIG. 2 is a cross-sectional illustration of the aforesaid embodiment with the annular members of FIG. 1 being assembled together and secured;

FIG. 3 is an elevational view of the assembly of FIG. 2 but with the ball member rotated ninety (90) degrees;

FIG. 4 is a sectional illustration similar to that of FIG. 2 taken substantially along section line 4—4 of FIG. 3; and FIG. 5 is an enlarged illustration of the ball member per se for use in describing one precise shape of the ball member.

Referring to the drawings, and more particularly to FIGS. 1, 2, 3 and 4, the socket indicated generally by the reference numeral 10 is fabricated of two annular sections or rings generally indicated, respectively, by the numerals 12 and 14, these rings being shown in detail in FIG. 1. The ring 12 has a cylindrical or sleeve-like portion 16 on one end and an inturned, frusto-conically shaped portion 18 on the other end. Similarly, the ring 14 has a cylindrical or sleeve-like portion 20 on one end and a frusto-conically shaped, inturned portion 22 on the other end. Joining the two portions 20 and 22 is an intermediate section 24 which serves a purpose as will become obvious from the description to follow.

These rings 12 and 14 may be formed of flat sections of sheet steel by a stamping operation, the outer diameter of the cylindrical portion 16 being made substantially coextensive with the inner diameter of the cylindrical portion 20. By thus forming the rings 12 and 14 as stampings, the cylindrical portions 16 and 20, respectively, may easily be telescoped together as shown more clearly in FIGS. 2 and 4.

The frusto-conical portions 18 and 22 of the two rings, respectively, are preferably of identical size and shape, the joining section 24 of the ring 14 providing the necessary reduction in diameter whereby this identity of design may be achieved.

The material from which the two rings 12 and 14 are stamped is sufficiently thick and strong so as to resist the normal forces of deformation which are usually applied to ball and socket assemblies.

Referring to FIGS. 2 and 4, the two rings 12 and 14 are telescoped together as already described and are secured together preferably by welding. In one embodiment, the weld 52 is provided between the end 26 of the cylindrical portion 20 and the outer surface of the frusto-conical portion 18 around the entire periphery of the two rings. Thus welded, the two rings 12 and 14 are rigidly secured together into an integrated, socket assembly.

Retained by the socket 10 and mounted for universal swiveling movement therein is a ball member generally indicated by the reference numeral 28. The two rings 12 and 14 are preformed to such size as to provide a clearance 30 with the ball member 28 for purposes which will become apparent from the succeeding description. Still further, the outer ends 32 and 34 of the socket 10 are dimensioned such as to be engaged by the ball member for retaining the latter in the socket.

In the illustrated embodiment of the invention, the ball member 28 is shown as having a cylindrical bore 36, but as will be apparent to persons skilled in the art, this bore may be eliminated, or altered in shape, design or size without departing from the spirit and scope of this invention.

The ball member 28 is preferably made of steel fabricated by any commonly practiced technique and may be hardened or unhardened as required by design specifications.

Once assembled, the ball 28 is retained by the socket 10 and is free to swivel universally therein.

Attention is now directed more particularly to the ball member 28, which is illustrated in enlarged form in FIG. 5. This ball member 28, while being generally spherical in shape, is slightly out-of-round. Preferably, the shape is that of an ellipsoid with the opposite ends being cut off. While the shape of an ellipsoid constitutes the preferred embodiment of this invention, as will become apparent from the following description, the shape may vary somewhat from the ellipsoidal so long as certain dimensional requirements are met. With respect to the ellipsoidal shape as shown in FIGS. 2, 4 and 5, the degree of out-of-roundness is illustrated in FIG. 5 by comparison with the shape of a true circle or sphere, as indicated by the dashed line 37. It will be noted that the degree of out-of-roundness is negligible only but, nevertheless, is present. The major axis of the ellipsoid is indicated by the numeral 38, and the ball member 28 is symmetrically formed thereabout. The ball member 28 has planar opposite ends 40 and 42, respectively, through which the coaxial bore 36 opens. While the ball member has thus been illustrated as having two opposite ends 40 and 42 which are flat and parallel, it will be apparent to persons skilled in the art that these ends may be rounded off or otherwise shaped without departing from the scope of this invention. The fact of importance is that as much of the ball member 28 as may be present, its shape should be out-of-round or ellipsoidal.

Being ellipsoidal, the minor diameter 44 is smaller than the "angular diameter" 46 which is drawn through the center 48 of the ball member to extend between the points 50 on the ball member surface which are spaced farthest apart. These points on the surface will be directly adjacent to the corners defined by the respective ends 40, 42 and the outer rounded surface of the ball member as indicated by the numeral 50. If the ball member 28 is truly symmetrical about its major axis 38, the center 48 of the ball member will be located midway between the ends of the major axis where they intersect, respectively, the planes of the two ends 40 and 42.

As viewed in FIG. 5, it should be observed that as the diameter 44 is swung either clockwise or counterclockwise in the plane of the drawing to one end 40 or 42, its length will gradually elongate in following the ellipsoidal shape until it eventually coincides with the longest diameter 46. While the ball member 28 need not necessarily be a true ellipsoid in shape, it nevertheless is necessary that the diametral dimenison 46 be greater than the dimension 44. In actual practice, this difference in dimension need only be negligible, and in an operative embodiment of this invention, the dimension 46 is 1.732 inches while the dimension 44 is 1.723 inches, leaving a differential of .009 inch. The ball member is therefore only slightly ellipsoidal when compared with a true sphere.

Having thus described the shape of the ball member 28, the significance of this particular shape will now be explained. In assembling the socket 10 to the ball member 28, the ball member is first inserted into one or the other of the ring members 12, 14. It may be assumed that the ball member is first inserted in the ring member 12. Following this, the ring member 14 is telescoped over the ring member 12 to the position illustrated in FIGS. 2 and 4.

While the two ring members 12 and 14 are thus loosely assembled together, the ball member 28 is rotated to the position illustrated in FIGS. 3 and 4, these two figures illustrating the same position. The ring members 12 and 14 are now telescoped together until they abut snugly against the ball member 28. Assuming that all of the dimensions are perfect, the rings will contact the ball member at eight different points, these points in FIGS. 3 and 4 being indicated by the reference numeral 50. While held in this contacting position, the two rings are welded together at 52, as already described, thereby rigidly securing the two rings 12 and 14 together. When the welding operation is completed, the extreme opposite end portions 54 and 56 of the two rings 12 and 14, respectively, will be spaced apart a distance 46a substantially equal to the length of the angular diameter 46. The annular portions of the two rings 12 and 14 indicated by the reference numerals 54 and 56, respectively, may be regarded as bearing surfaces such that it will be apparent that these bearing surfaces have a spacing 46a therebetween which correspond to the largest dimension or diameter 46 of the ball member 28. For the specific example already given hereinabove, the distance between the points 54 and 56 will be approximately 1.732 inches or perhaps .0005 or .001 inch larger so as to provide some little clearance. However, this particular clearance does not have to be deliberately provided for.

After the weld 52 has been applied, the ball member 28 may be rotated to any position such as that shown in FIG. 2. In any of these positions, a clearance will exist between the bearing surfaces 54 and 56 and the ball member 28, this being attributable to the fact that the ball member 28 is slightly out-of-round. For example, if the minor diameter 44 of the ball member 28 is aligned with the dimension 46a between the bearing surfaces 54 and 56, respectively (the dimensions 46 and 46a being substantially identical), a difference of .009 inch will exist. As will now appear obvious, as the ball member 28 is swung from its extreme position as illustrated in FIG. 4 to, for example, the centered position as illustrated in FIG. 2, progressively more clearance will be provided between the rings 12 and 14 and the ball member. Thus, the ball 28 can never bind the socket 10 nor be inhibited in swiveling movement by friction. The fact that the two rings 12 and 14 were originally assembled to the large diameter portions of the ball member automatically provides the necessary clearance between the ball member and the socket for free swiveling movement.

While the socket 10 has been illustrated as being composed of two rings 12 and 14, it will appear as obvious to a person skilled in the art that a forging or stamping other than a ring having the internal shape of ring 14 may be used in combination with a ring element identical to ring 12. In other words, a handle, bar or frame member having a socket shaped in conformity to the internal configuration of the ring 14 may be fitted with a ring 12 for providing the socket 10. Also, while a weld 52 has been shown, it will appear as obvious that the two ring members 12 and 14 may be threaded or otherwise joined together to provide a rigid socket structure.

By forming the socket 10 onto the large diameter portion of the ball member 28, positive control of the dimensional tolerances between the ball and socket is achieved. If a greater dimensional tolerance is desired, it is only necessary to shorten the minor diameter 44 or lengthen the angular diameter 46 of the ball member 28. In other words, it is only necessary to compress the center diameter of the ball member to the desired extent. On the other hand, if it is desired to reduce the operating clearances between the ball member and the socket bearing surfaces, it is only necessary to make the ball member 28 conform more to the shape of a sphere, or in other words enlarge the diameter 44.

As will now be apparent, the ball and socket assembly of this assembly is a high production item which is quite uniform in its dimensional and quality characteristics. As already explained, operating clearances between the socket and ball member are positively and automatically provided. Secondly, since the socket sections 12 and 14 are stampings, the internal shapes thereof are precisely determined prior to final assembly to the ball member. Thus, there is little, if any, danger of any internal socket defects being inadvertently overlooked. When the socket sections 12 and 14 are made by stamping techniques, a relatively high rate of production and reduced cost may be realized.

As another advantage residing in this invention, since the socket sections 12 and 14 are preformed in the stamping operation, the ball member 28 does not need to be prehardened. This is true, since all that is required in the fabrication of the socket is that the two socket sections be snugged into contact with the ball member for locating the same while the welding operation is performed. This does not result in any particular, distortional force being applied to the ball member. As explained earlier, if it were necessary for the socket edges to be coined or forged into shape, the ball itself must serve as the matrix or backing against which the shaping operation is performed. In this latter instance, it is absolutely essential that the ball member be hardened.

Finally, by forming the two rings 12 and 14 such that all of the portions of the socket cavity between the bearing surfaces 54 and 56 are of larger diameter that the distance 46a, there is no danger of any binding engagement between the ball member 28 and the socket cavity. This clearance is indicated by the reference numeral 30 and was previously described.

While we have described above the principles of our invention in connection with specific apparatus, it is to be clearly understood that this description is made only by way of example and not as a limitation to the scope of our invention.

What is claimed is:

1. The method of fabricating a ball and socket assembly comprising the steps of forming a ball member to an ellipsoidal shape, fabricating a first annular section having a cylindrical portion on one end and an inturned frusto-conically shaped portion on the other end defining a first end opening, fabricating a second annular section having a cylindrical portion on one end and an iturned frusto-conically shaped portion on the other end defining a second end opening, said first and second end openings having substantially the same diameter, assembling both said annular sections onto said ball member with said cylindrical portions being telescoped together, positioning said ball member in said sections such that said inturned portions engage only the larger diameter portions of said ball member, and welding said cylindrical portions together during the aforesaid engagement, thereby providing an integrated socket assembly which retains said ball member.

2. The method of fabricating a ball and socket assembly comprising the steps of forming a ball member to an ellipsoidal shape, fabricating a first annular section having a cylindrical portion on one end and an inturned frusto-conically shaped portion on the other end, fabricating a second annular section having a cylindrical portion on one end and an inturned frusto-conically shaped portion on the other end, assembling both said annular sections onto said ball member with said cylidrical portions being telescoped together, positioning said ball member in said sections such that said inturned portions engage only the larger diameter portions of said ball member, and securing said cylindrical portions together during the aforesaid engagement, thereby providing an integrated socket assembly which retains said ball member.

3. The method of fabricating a ball and socket assembly comprising the steps of forming a ball member to an ellipsoidal shape, fabricating a first annular section which has a first cylindrical portion on one end and an inturned portion on the other end defining a first end opening having a diameter smaller than said first cylindrical portion, fabricating a second annular section which has a second cylindrical portion on one end and an inturned portion on the other end defining a second end opening having a diameter smaller than said second cylindrical portion, assembling both said annular sections onto said ball member with said cylindrical portions being telescoped together, positioning said ball member in said sections such that said inturned portions engage only the larger diameter portions of said ball member, and securing said cylindrical portions together during the aforesaid engagement, thereby providing an integrated socket assembly which retains said ball member.

4. The method of fabricating a ball and socket assembly comprising the steps of forming a ball member to a shape which is out-of-round, said ball member having a midportion which is of smaller diameter than the remaining portions, assembling two annular socket sections onto said ball member in such position that bearing surfaces on said socket sections contact only the larger diameter portions of said ball member, and securing said socket sections together while they are thus contacted with said ball member.

5. The method of fabricating a ball and socket assembly comprising the steps of assembling two socket sections onto a ball member which is out-of-round in such position that bearing surfaces on said two sections engage only the larger diameter portions of said ball member, and securing said two sections together while they are thus engaged with said ball member.

6. The method of fabricating a ball and socket assembly comprising the steps of forming a ball member to a shape corresponding to an ellipsoid, and abutting the bearing surfaces of a socket member against only the larger diameter portions of said ball member for establishing the distance between said bearing surfaces.

7. The method of fabricating a ball and socket assembly comprising the steps of forming a ball member to an ellipsoidal shape, fabricating a first annular section which has a first cylindrical portion on one end and a first inturned frusto-conically shaped portion on the other end, fabricating a second annular section which has a second cylindrical portion on one end and a second inturned frusto-conically shaped portion on the other end, said first and second inturned portions being of substantially the same size and shape, the second cylindrical portion being larger in diameter than said first cylindrical portion, providing an annular joining portion which connects said second cylindrical portion to said second inturned portion, assembling both of said annular sections onto said ball member with said cylindrical portions telescoping together, positioning said ball member in said sections such that said inturned portions engage only the larger diameter portions of said ball member, and securing said cylindrical portions together during the aforesaid engagement, thereby providing an integrated socket assembly which retains said ball member.

References Cited in the file of this patent

UNITED STATES PATENTS

| | | |
|---|---|---|
| 1,073,264 | Mayer et al. | Sept. 16, 1913 |
| 1,187,642 | Milz | June 20, 1916 |
| 1,266,061 | Scoville | May 14, 1918 |
| 2,366,668 | Heim | Jan. 2, 1945 |
| 2,787,048 | Heim | Apr. 2, 1957 |
| 2,804,679 | Tracy | Sept. 3, 1957 |
| 2,835,521 | White | May 20, 1958 |
| 2,885,248 | White | May 5, 1959 |